May 7, 1957   C. L. DAMRON   2,791,037
LIGHT REFLECTING PLUMB BOB
Filed Dec. 3, 1953

INVENTOR.
Cordell L. Damron
BY *Victor J. Evans & Co.*
ATTORNEYS

United States Patent Office 2,791,037
Patented May 7, 1957

2,791,037

LIGHT REFLECTING PLUMB BOB

Cordell L. Damron, Yeager, Ky.

Application December 3, 1953, Serial No. 395,870

1 Claim. (Cl. 33—216)

This invention relates to tools for surveyors, carpenters, lineman and the like, and in particular a plumb bob having a reflecting surface and particularly adapted for use by a transit man in surveying in tunnels, mines, and the like where it is necessary to use a light to indicate the position of the plumb bob.

The purpose of this invention is to provide a plumb bob with a reflecting surface whereby a transit man may determine the position of the plumb bob by rays from a light on his cap without removing the light from his head.

In the conventional manner of using plumb bobs in mines and the like the transit man removes the light from his head and the light is held behind the plumb bob to indicate the position thereof whereby the string of the plumb bob is lined up with the cross hair of the transit. This method is not only inconvenient but requires considerable time and is also inefficient. With this thought in mind this invention contemplates a plumb bob having a reflecting surface wherein the engineer at the transit lines up the plumb bob with the cross hair of the transit by the reflection of light from a light on the engineer's head.

The object of this invention is, therefore, to provide means for forming a plumb bob wherein material having a reflecting outer surface may be used for the plumb bob and wherein means is provided for adding weight to the plumb bob.

Another object of the invention is to provide means for forming a plumb bob in which a phosphorous insert may be incorporated in the point of the plumb bob.

A further object of the invention is to provide a plumb bob having a reflecting surface in which the plumb bob is of a simple and economical construction.

With these and other objects and advantages in view the invention embodies a plumb bob having a frusto-conical shaped body with a transparent hard glass point having a phosphorous insert therein and having a housing providing a cap threaded on a coupling member on the upper end and having a spad cord connecting nut or plug threaded in the upper end.

Other features and advantages of the invention will appear from the following description taken in connection with the drawing, wherein.

Figure 1:
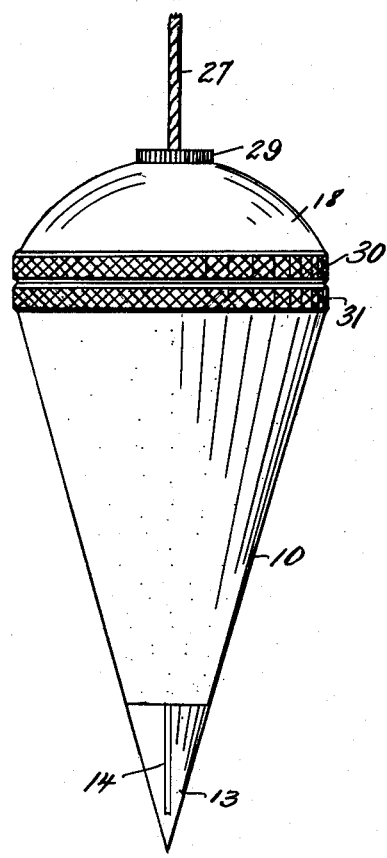
Figure 1 is a side elevational view of the improved plumb bob.

Referring now to the drawing wherein like reference characters denote corresponding parts the improved plumb bob of this invention includes a frusto-conical shaped body 10 having mercury 11 in a cavity 12 therein, a point 13 having an elongated phosphorous insert 14 therein threaded in a socket 15 in the lower end of the body, a disc 16 positioned against the end of an externally threaded neck 17, and threaded in the lower end of a cap or housing 18 threaded on the neck 17, and having a plug 19 threaded in a boss 20 in the upper end thereof.

Figure 2:
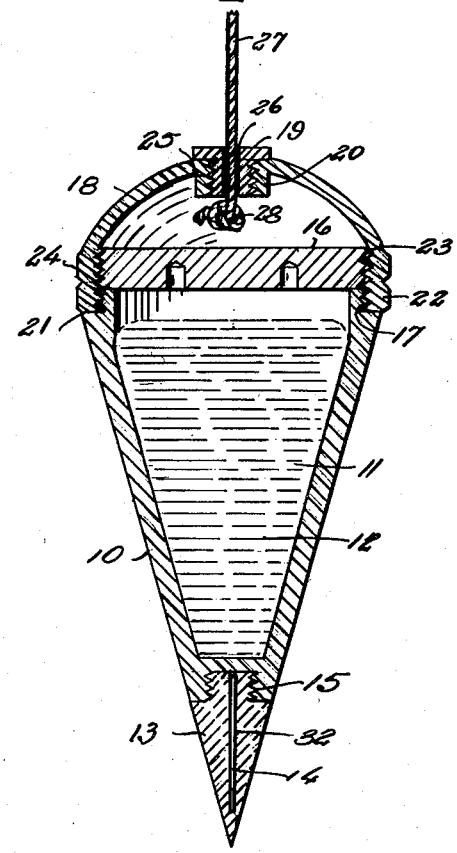
Figure 2 is a vertical section through the plumb bob.

The body 10 is formed of transparent material or material pervious to light rays whereby with mercury positioned against the inner surface light rays are reflected thereby and, as shown in Fig. 2 the threaded socket 15 is provided in a solid portion at the lower end of the body.

The upper end of the body 10 is provided with a shoulder 21 and an annular ring 22 integral with an extended from the cap 18 is threaded on the neck 17 with the lower end in engagement with the shoulder 21. The peripheral surface of the disc 16 is provided with threads 23 by which it is threaded into the lower end of the cap, and the lower portion of the cap is also provided with a bead 24 which ise spaced from the ring 22.

The boss 20 extends downwardly in the housing 18 and the boss is provided with internal threads 25 that receive the plug 19.

The plug 19 is provided with a bore 26 through which a string or cord 27, that is adapted to support the bob from spads, extends. The lower end of the string or cord may be provided with a knot 28 for retaining the cord in the plug.

As illustrated in Fig. 1 the outer surface of the head of the plug 19 is provided with ribs or knurling, as indicated by the numeral 29, the outer surface of the bead 24 is knurled, as shown at the point 30, and the outer surface of the ring 22 is also knurled as indicated by the numeral 31.

The point or tip 13 is provided with an elongated slot or bore 32 in which the phosphorus insert 14 is positioned, as shown in Fig. 2.

With the parts assembled in this manner plumb bobs suspended by a cord may be observed in the dark by light rays reflected from a light on the cap of a transit operator with the transit remotely situated from the plumb bob.

It will be understood that modifications, within the scope of the appended claim, may be made in the design and arrangement of the parts without departing from the spirit of the invention.

What is claimed is:

In a plumb bob, the combination which comprises a hollow frusto-conical shaped body positioned with the large end extended upwardly and having a threaded neck thereon and with a small end extended downwardly and having a threaded socket therein, a transparent point having a phosphorous insert therein removably threaded in the socket in the lower end of the body, a housing threaded on the neck on the upper end of the body, a disc threaded in said housing, a boss having an internally threaded bore mounted on the inside of said housing, a line attaching plug threaded into the bore in said housing, and mercury positioned in the cavity of the body.

References Cited in the file of this patent

UNITED STATES PATENTS

| | | |
|---|---|---|
| 1,052,075 | Martin | Feb. 4, 1913 |
| 1,346,360 | White | July 13, 1920 |
| 2,420,096 | Roose | May 6, 1947 |
| 2,538,475 | Skrastin | Jan. 16, 1951 |
| 2,621,421 | Owens | Dec. 16, 1952 |
| 2,755,554 | MacMillan | July 24, 1956 |

FOREIGN PATENTS

| | | |
|---|---|---|
| 106,887 | Great Britain | June 14, 1917 |